US011601327B1

(12) United States Patent
Khalid et al.

(10) Patent No.: US 11,601,327 B1
(45) Date of Patent: Mar. 7, 2023

(54) NETWORK ADAPTATION BASED ON ASSESSMENT OF METEOROLOGICAL IMPACT

(71) Applicant: Charter Communications Operating, LLC, St. Louis, MO (US)

(72) Inventors: Saran Khalid, Denver, CO (US); Perwaiz Akhtar, Aurora, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 17/524,657

(22) Filed: Nov. 11, 2021

(51) Int. Cl.
| | |
|---|---|
| *G06F 15/173* | (2006.01) |
| *H04L 41/0631* | (2022.01) |
| *H04L 41/08* | (2022.01) |
| *H04L 41/12* | (2022.01) |
| *H04L 41/0654* | (2022.01) |
| *H04L 41/0816* | (2022.01) |

(52) U.S. Cl.
CPC ........ *H04L 41/065* (2013.01); *H04L 41/0654* (2013.01); *H04L 41/0816* (2013.01); *H04L 41/0886* (2013.01); *H04L 41/12* (2013.01)

(58) Field of Classification Search
CPC ............... H04L 41/065; H04L 41/0654; H04L 41/0816; H04L 41/12
See application file for complete search history.

(56) References Cited

U.S. PATENT DOCUMENTS

| | | |
|---|---|---|
| 9,246,755 B2 | 1/2016 | DeCusatis et al. |
| 9,253,026 B2 | 2/2016 | DeCusatis et al. |
| 10,771,146 B1 | 9/2020 | Singh et al. |
| 2017/0230267 A1* | 8/2017 | Armolavicius ....... H04L 43/062 |
| 2017/0345281 A1* | 11/2017 | Shaw .................. H04L 41/0816 |
| 2018/0013791 A1 | 1/2018 | Healey et al. |
| 2018/0091971 A1 | 3/2018 | Liang et al. |
| 2019/0097946 A1* | 3/2019 | Lokman .................. H04L 49/25 |
| 2019/0200244 A1 | 6/2019 | Polepalli |
| 2020/0240659 A1 | 7/2020 | Maruyama et al. |
| 2020/0387433 A1 | 12/2020 | Wang et al. |
| 2021/0051437 A1 | 2/2021 | Mukherjee et al. |
| 2022/0053047 A1* | 2/2022 | Lenrow ................... G06F 9/547 |

* cited by examiner

*Primary Examiner* — Wing F Chan
*Assistant Examiner* — Joseph R Maniwang
(74) *Attorney, Agent, or Firm* — Mendelsohn Dunleavy, P.C.; Steve Mendelsohn

(57) ABSTRACT

A network-management system capable of reducing negative impacts of natural disasters on network services. In an example embodiment, in response to an indication of potential failure of one or more network resources in a meteorological event, the network controller operates to orchestrate re-hosting of affected VNFs and perform SDN-based reconfiguration of switches to adapt the traffic flows to the re-hosted VNFs. The indication of potential failure can be provided, e.g., by a specialized application capable of estimating the probabilities of failure for individual network resources based on a plurality of inputs, such as digital weather forecasts for the corresponding geographical area, geographical locations of individual network resources, tolerances of different network resources to specific environmental conditions, previous history of network damage in the same geographical area, alerts from power suppliers, etc. Upon reconfiguration, the network may beneficially have a lower likelihood of service disruptions and/or outages during the meteorological event.

19 Claims, 8 Drawing Sheets

100

200

100

NETWORK ADAPTATION BASED ON ASSESSMENT OF METEOROLOGICAL IMPACT

BACKGROUND

Field

Various example embodiments relate to communication equipment and, more specifically but not exclusively, to network management.

Description of the Related Art

This section introduces aspects that may help facilitate a better understanding of the disclosure. Accordingly, the statements of this section are to be read in this light and are not to be understood as admissions about what is in the prior art or what is not in the prior art.

The term "network management" refers to processes, tools, and applications used to administer, operate, and maintain a network infrastructure. An example network-management system may use software and hardware to collect and analyze data and push out configuration changes for improving performance, reliability, and/or security. Such configuration changes may be implemented using various (re)configurable network devices, such as switches, routers, access points, controllers, etc.

SUMMARY OF SOME SPECIFIC EMBODIMENTS

Disclosed herein are various embodiments of a network-management system capable of reducing negative impacts of natural disasters on network services. In an example embodiment, in response to an indication of potential failure of one or more network resources in a meteorological event, the electronic network controller operates to orchestrate re-hosting of affected virtual network functions (VNFs) and perform Software Defined Networking (SDN)-based reconfiguration of switches to adapt the traffic flows to the re-hosted VNFs. The indication of potential failure can be provided, e.g., by a specialized application capable of estimating the probabilities of failure in the meteorological event for individual network resources based on a plurality of inputs, such as digital weather forecasts for the corresponding geographical area, geographical locations of individual network resources, tolerances of different network resources to specific environmental conditions, previous history of network damage in the same geographical area, alerts from power suppliers, etc. Upon reconfiguration, the network may beneficially have a lower likelihood of service disruptions and/or outages during and in the immediate aftermath of the meteorological event.

According to an example embodiment, provided is an apparatus, comprising: an electronic network controller having an application-programming interface to receive therethrough an indication of potential failure of at least one of network resources during a meteorological event, the network resources including a plurality of servers to host virtual network functions (VNFs) and a plurality of switches configurable using software defined networking (SDN); and wherein, in response to the received indication, the electronic network controller is configured to: orchestrate re-hosting of at least one VNF component to a different one of the servers; and perform SDN-based reconfiguration of at least one of the switches to adapt network traffic to the at least one VNF component being hosted at the different one of the servers.

According to another example embodiment, provided is a method implemented by an electronic network controller, the method comprising: receiving, through an application-programming interface, an indication of potential failure of at least one of network resources during a meteorological event, the network resources including a plurality of servers to host virtual network functions (VNFs) and a plurality of switches configurable using software defined networking (SDN); orchestrating, in response to the indication, re-hosting of at least one VNF component to a different one of the servers; and performing SDN-based reconfiguration of at least one of the switches to adapt network traffic to the at least one VNF component being hosted at the different one of the servers.

According to yet another example embodiment, provided is a non-transitory machine-readable medium, having encoded thereon program code, wherein, when the program code is executed by a machine, the machine implements a method comprising: estimating individual probabilities of failure for individual ones of network resources during a meteorological event, the network resources including a plurality of servers to host virtual network functions (VNFs) and a plurality of switches configurable using software defined networking (SDN); selecting re-hosting of at least one VNF component to a different one of the servers based on the individual probabilities; and transmitting to an electronic network controller one or more instructions to orchestrate the re-hosting and to perform SDN-based reconfiguration of at least one of the switches to adapt network traffic to the at least one VNF component being hosted at the different one of the servers.

According to yet another example embodiment, provided is a machine-implemented method, comprising: estimating individual probabilities of failure for individual ones of network resources during a meteorological event, the network resources including a plurality of servers to host virtual network functions (VNFs) and a plurality of switches configurable using software defined networking (SDN); selecting re-hosting of at least one VNF component to a different one of the servers based on the individual probabilities; and transmitting to an electronic network controller a set of instructions to orchestrate the re-hosting and to perform SDN-based reconfiguration of at least one of the switches to adapt network traffic to the at least one VNF component being hosted at the different one of the servers.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Communications networks are often populated with a large number and increasingly diverse variety of proprietary hardware appliances. For example, a launch of a new network service often relies on yet another hardware appliance, and finding the space and power to accommodate these "boxes" may be difficult. Furthermore, typical hardware-based appliances may reach their end of life quite rapidly, which may cause much of the procure/design/integrate/deploy cycle to be repeated with ever-increasing frequency.

Network Functions Virtualization (NFV) aims to address the above-indicated problems in the state of the art by consolidating many network-equipment types onto industry-standard, high-volume servers, switches, and storage units, e.g., located in data centers, network nodes, etc. Such industry-standard hardware is capable of implementing a range of network functions in software, which can be reconfigured, updated, moved, and/or instantiated in the network as needed, without requiring new equipment to be installed. In some implementations, NFV may be applicable to most data-plane packet processing and/or control-plane functions in various fixed and mobile network infrastructures.

Importantly, NFV can be highly complementary to Software Defined Networking (SDN). Thus, the NFV and SDN technologies can be mutually beneficial but not necessarily interdependent. For example, NFV can be deployed without SDN being required, and vice versa.

SDN is an approach to building networking equipment and software in a manner that separates and abstracts certain elements of these systems. In an example implementation, SDN accomplishes this abstraction by decoupling the control and data planes from one another, e.g., such that the control plane resides centrally and the forwarding components remain distributed. Such a control plane may (i) provide a common abstracted view of the network to higher-level applications and entities, e.g., using the corresponding application-programming interfaces (APIs), and (ii) program the forwarding behavior of the data plane, e.g., using device-level APIs of the physical equipment distributed within the network.

Although NFV may not be dependent on SDN or SDN concepts, there may be inherent benefits in leveraging SDN concepts in implementing and managing some of the NFV infrastructure. As such, NFV may be regarded as an SDN use case, e.g., in service-provider environments. It may also be beneficial for some other SDN use cases to incorporate at least some of the NFV features.

Figure 1:
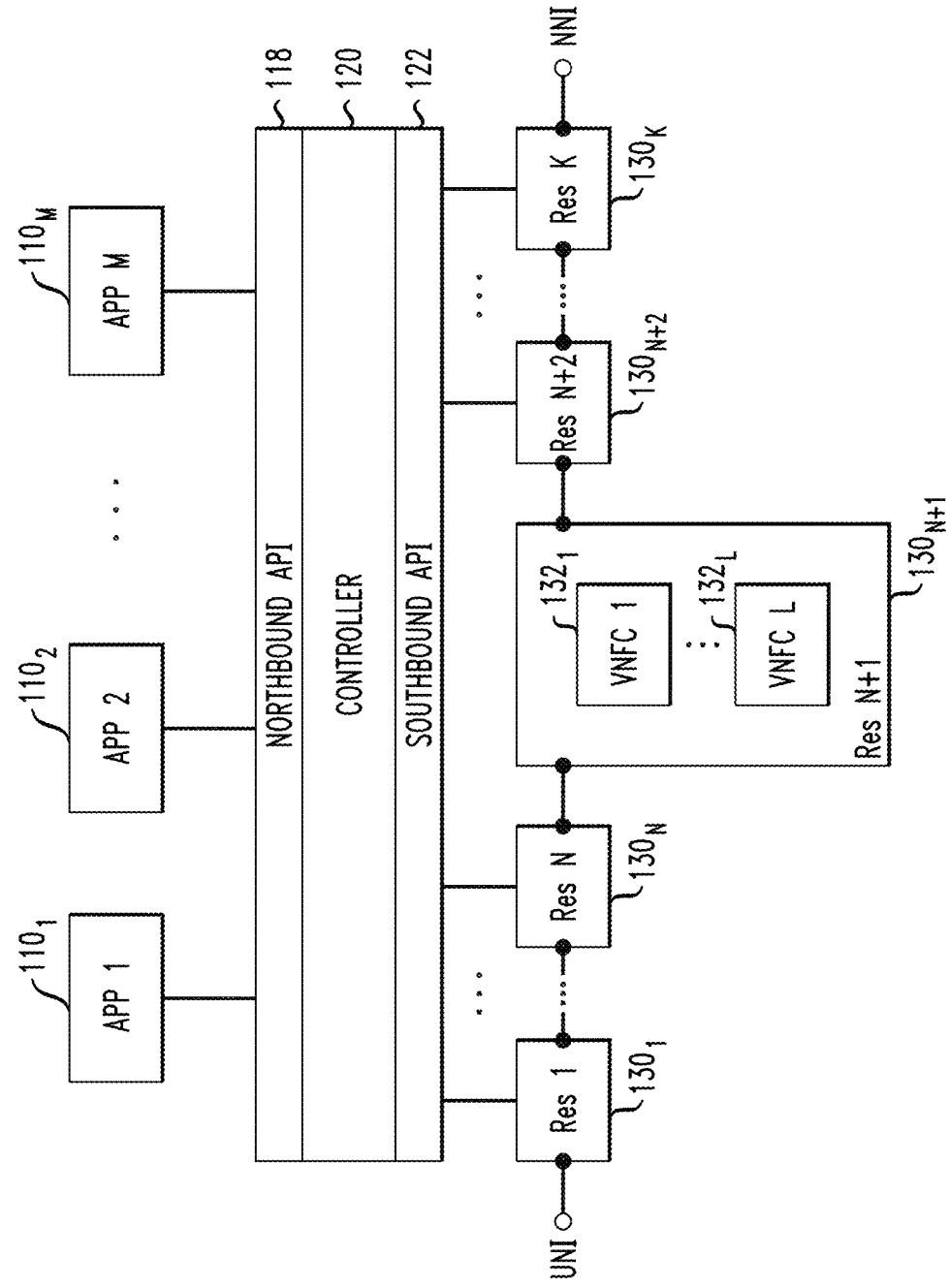
FIG. 1 schematically shows a network architecture under which example embodiments can be practiced.

FIG. 1 schematically shows the architecture of a network 100 in which example embodiments can be practiced. In some embodiments, network 100 can be a domain of a larger network (not explicitly shown in FIG. 1). In operation, network 100 may provide services, e.g., through one or more User-Network Interfaces (UNIs), only one of which (labeled UNI) is explicitly shown in FIG. 1 for clarity. Some of the services may include external handoffs through one or more Network-Network Interfaces (NNIs), only one of which (labeled NNI) is explicitly shown in FIG. 1 for clarity. Network 100 is designed to use both NFV and SDN, e.g., as explained in more detail below.

Network 100 comprises an electronic network controller 120 and a plurality of network resources $130_1$-$130_K$. The number K depends on the embodiment and can be on the order of 100 or even 1000. Network resources $130_1$-$130_K$ may be used to implement and/or work in conjunction with servers, routers, switches, storage units, nodes, etc. Some subsets of network resources $130_1$-$130_K$ may be physically co-located while some other subsets of network resources $130_1$-$130_K$ may be distributed over different physical locations.

Network controller 120 is connected to applications (Apps) $110_1$-$110_M$ by way of a northbound API 118. Network controller 120 is further connected to network resources $130_1$-$130_K$ by way of a southbound API 122. In operation, network controller 120 may accept a service request and orchestrate the corresponding service using network resources $130_1$-$130_K$. The SDN functionality enables controller 120 to virtualize some or all of network resources $130_1$-$130_K$, e.g., for the benefit of one or more clients, and then to orchestrate the shared use of these resources on behalf of client demands. Both virtualization and orchestration may be recursive and involve more than subdividing and/or combining subsets of network resources $130_1$-$130_K$, as can be readily appreciated by persons of ordinary skill in the pertinent art.

For example, in response to a service request, network controller 120 may select a suitable subset of network resources $130_1$-$130_K$, set up appropriate connectivity between the selected network resources, and provision the selected network resources with functions and/or parameters that may be appropriate for the requested service. One example of such functions may be a connectivity fault management (CFM) maintenance group end point (MEP), with parameters thereof set for the requested service. Such a function might already be latent in the selected network resource(s), but might also need to be downloaded as a code module before being initialized, provisioned, and activated. In the latter scenario, network controller 120 thereby instantiates a new network resource $130_{K+1}$, i.e., increases the number K. In some cases, network controller 120 may operate to decrease the number K. For some services, network controller 120 may also provision endpoint attributes for connectivity to the corresponding UNI(s) and/or NNI(s).

At least some of network resources $130_1$-$130_K$ may comprise one or more NFV virtual network functions (VNFs). As an example, FIG. 1 explicitly shows the network resource $130_{N+1}$ as comprising VNF components (VNFCs) $132_1$-$132_L$. Some or all of the other network resources $130_k$ may also comprise respective VNFCs, where 1≤k≤K. The NFV functionality of network controller 120 enables the controller to instantiate a pertinent VNF using one or more VNFCs. When two or more VNFCs are involved in a particular VNF, network controller 120 is responsible for properly interconnecting those VNFCs. Network controller 120 may also use already existing VNFs, e.g., through the continuing life-cycle management thereof, scaling up or down, etc. Several services may use a subset of network resources $130_1$-$130_K$ simultaneously. However, for some services, e.g., parental control functions or customized filters in a firewall, a given network resource may require per-service provisioning. Due to the latter limitation, network controller 120 is configured to "know," e.g., which VNF instance is in use for the given service and to have management-control access to that VNF instance.

Figure 2:
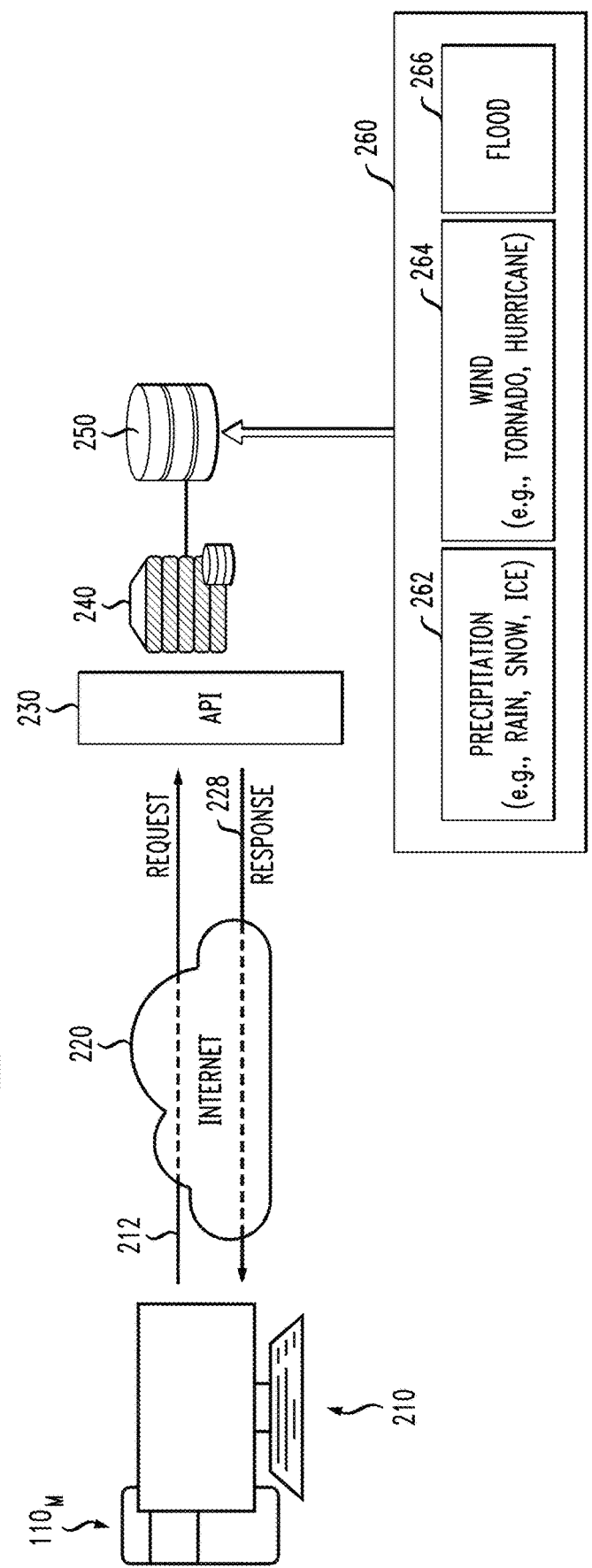
FIG. 2 shows a block diagram of an information system that can be used in conjunction with the network of FIG. 1 according to an embodiment.

FIG. 2 shows a block diagram of an information system 200 that can be used in conjunction with network 100 (FIG. 1) according to an embodiment. System 200 comprises a computer 210 running an application $110_m$ (where $1 \leq m \leq M$; also see FIG. 1), which is described in more detail below in reference to FIG. 3. System 200 further comprises a server 240, which computer 210 can access to provide appropriate inputs to application $110_m$. In some embodiments, computer 210 can similarly connect to two or more different servers (not explicitly shown in FIG. 2) to provide inputs to application $110_m$.

Server 240 is connected to a database 250 configured to receive and store therein information from a weather-forecast service 260. In an example embodiment, weather-forecast service 260 may provide precipitation forecasts 262, wind forecasts 264, flood forecasts 266, etc. Forecasts 262-266 may typically be sufficiently geographically resolved, i.e., provided at a relatively small bin size. The bin size may depend on the embodiment and/or capabilities of weather-forecast service 260.

In operation, computer 210 may send a query 212 to server 240. Query 212 may be transmitted to server 240 through one or more networks 220 (e.g., the Internet) and a corresponding API 230. In an example embodiment, API 230 can be a REST API, where REST stands for Representational State Transfer.

In response to query 212, server 240 retrieves from database 250 the requested information, generates a corresponding query response 228, and transmits the query response back to computer 210 by way of API 230 and network(s) 220. Computer 220 then feeds the received query response 228 into application $110_m$. Application $110_m$ may typically receive additional inputs/information from network 100, e.g., as explained below.

Figure 3:
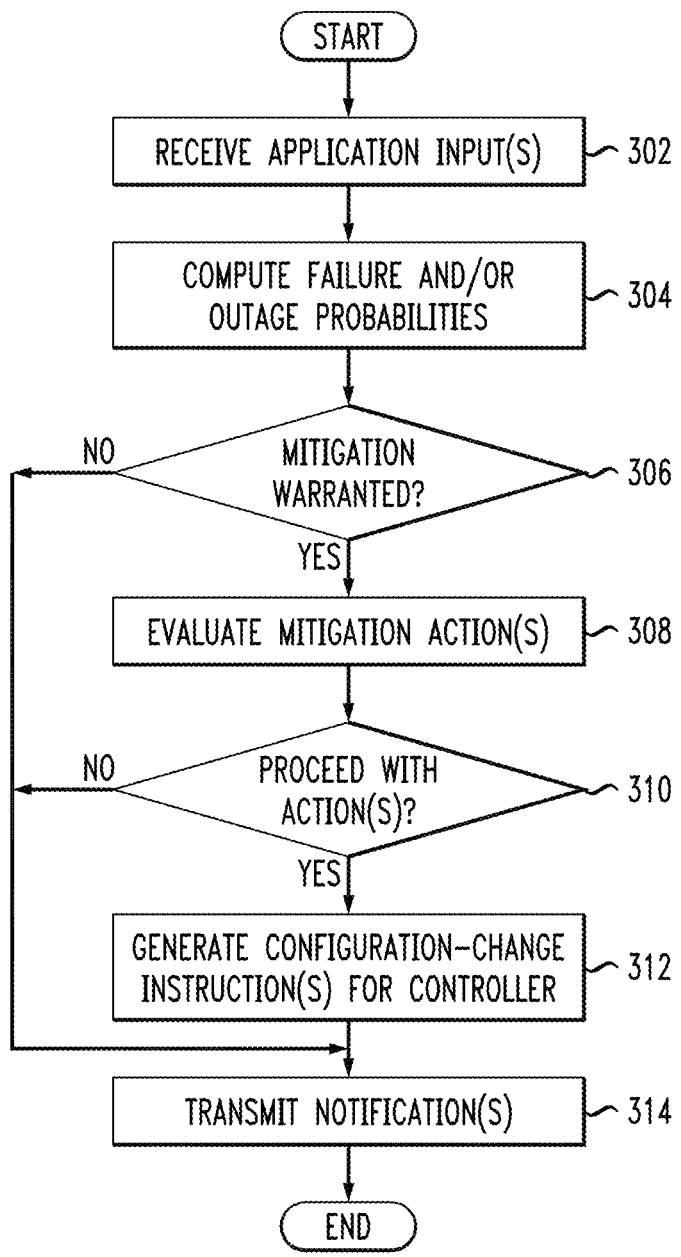
FIG. 3 shows a flowchart of a method of assessing meteorological impact that can be implemented using the information system of FIG. 2 according to an embodiment.

FIG. 3 shows a flowchart of a method 300 of assessing meteorological impact on network 100 that can be implemented using application $110_m$ according to an embodiment.

Method 300 begins at step 302, whereat application $110_m$ is provided with appropriate inputs corresponding to network 100.

A first set of inputs to application $110_m$ may be based on one or more query responses 228 (see FIG. 2). A corresponding query 212 may typically be configured such that the query response 228 contains detailed information only for a given geographical area with a given bin size. The geographical area may be the area of network 100 wherein the potential impact of the upcoming meteorological event can be relatively high. The bin size may typically be selected such that different locations of at least some resources $130_k$ can be resolved. In some cases, the bin size may be selected such that different locations of at least some VNFCs 132 can be resolved.

A second set of inputs to application $110_m$ may be based on a geographical map, having specified therein sufficiently accurate locations of various elements of network 100, such as power supplies, resources $130_k$ and/or other pertinent network devices.

A third set of inputs to application $110_m$ may provide estimated tolerances of various elements of network 100 to specific environmental conditions. For example, some (e.g., pole-mounted or aerial) network devices may be susceptible to wind damage. Each of such devices can therefore be assigned a threshold wind velocity at which the device is likely to get damaged and/or fail to function properly. The threshold wind velocity may take into account surface-clutter and other terrain information, the presence of taller buildings, effects of wind tunneling, and the like. Some other network devices may be susceptible to rain and/or snow accumulation. Each of such devices can therefore be assigned a threshold precipitation amount and/or precipitation rate above which the device is likely to get damaged and/or fail, e.g., due to flooding and/or loss of electrical power.

A fourth set of inputs may rely on historical information. Such historical information may be based, e.g., on a catalog of actual network damages caused by similar meteorological events in the past.

A fifth set of inputs may rely on alerts from power providers. Such alerts may provide maps of potential power-outage areas, as estimated by the corresponding power company.

One or more additional sets of inputs may be provided to application $110_m$ in some alternative embodiments.

At step 304, application $110_m$ operates to compute the probabilities of failure for individual network elements based on the inputs received at step 302. Application $110_m$ then further operates to compute the outage probabilities for individual services based on the inputs received at step 302 and on the computed probabilities of failure of individual network elements.

At step 306, application $110_m$ operates to compare one or more probabilities computed at step 304 with one or more corresponding threshold values to determine whether or not one or more preventive mitigation actions may be warranted. More specifically, if a specific probability exceeds the corresponding threshold probability, then a preventive mitigation action is deemed to be warranted. If at least one preventive mitigation action is deemed to be warranted, then the processing of method 300 is directed to step 308. Otherwise, the processing of method 300 is directed to step 314.

At step 308, application $110_m$ operates to evaluate one or more possible preventive mitigation actions. The evaluation of such actions may typically be made, e.g., by: (1) computing failure and/or outage probabilities corresponding to the network configuration, wherein the corresponding putative actions have been implemented; and (2) comparing the failure and/or outage probabilities of the new configuration with those of the present configuration. The corresponding computations can be performed, e.g., similar to the computations of step 304. Example preventive mitigation actions may include but are not limited to: (i) rerouting data flows through network 100, e.g., using the SDN functionality thereof; (ii) utilizing redundancy (if any) built into network 100 to temporarily exclude impacted network elements; (iii) reconfiguring one or more VNFs to temporarily exclude one or more corresponding impacted VNFCs, such as some or all of VNFCs $132_1$-$132_L$, FIG. 1; and (iv) re-hosting one or more VNFs in network 100, e.g., using the NFV functionality thereof. Illustrative specific examples of some of such preventive mitigation actions are described below in reference to FIGS. 4-6.

At step 310, application $110_m$ operates to select and possibly proceed with instructions for a new configuration of network 100 based on the evaluations of step 308. In an example embodiment, a new configuration of network 100 may be selected, e.g., such that the resulting failure and/or outage probabilities are approximately minimized. If such a configuration is identified, then a decision on whether or not to proceed with the corresponding configuration change may be made by thresholding one or more probability differences between the present and identified configurations. For example, in some cases, wherein the lowering of the probabilities is deemed to be too small (e.g., below the corresponding fixed threshold), the decision may be not to proceed with the corresponding configuration change. In this case, the processing of method 300 is directed to step 314. Otherwise, the processing of method 300 is directed to step 312.

At step 312, application $110_m$ operates to generate a corresponding set of configuration-change instructions and then transmit the generated set of instructions, via northbound API 118, to network controller 120. In response to the received instructions, network controller 120 may operate to generate a corresponding set of physical-device instructions and transmit the latter instructions, via southbound API 122, to the corresponding resources $130_k$, etc.

At step 314, application $110_m$ and/or network controller 120 may generate and transmit one or more notifications. The notifications transmitted at step 314 may depend on the processing path to this step and may include suitable system notifications, user notifications, network-administrator notifications, and the like.

The processing of method 300 may be terminated upon completion of step 314.

Figure 4:
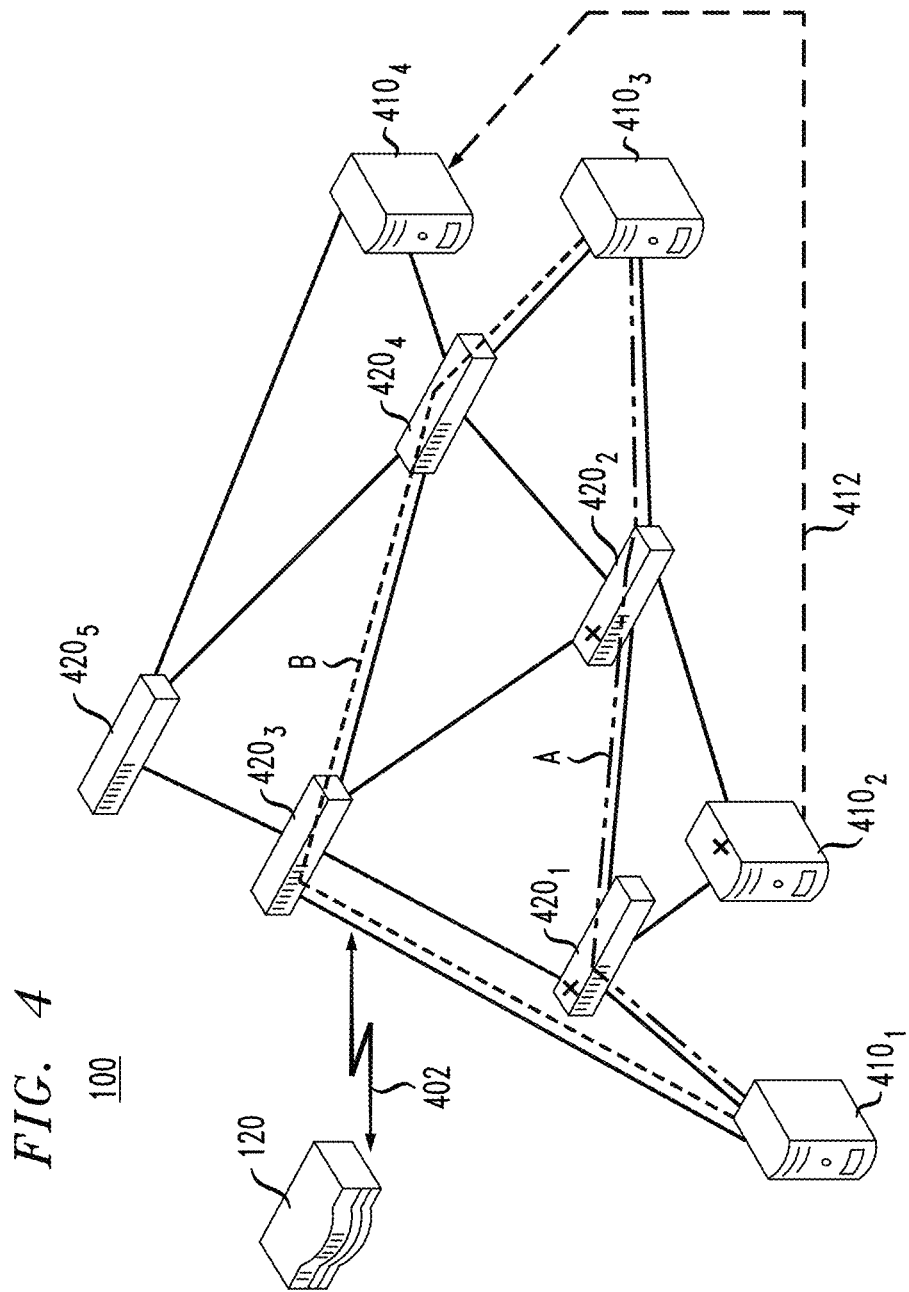
FIG. 4 illustrates an example reconfiguration of the network of FIG. 1 performed based on the method of FIG. 3 according to an embodiment.

FIG. 4 schematically illustrates an example reconfiguration of network 100 performed based on method 300 according to an embodiment. More specifically, FIG. 4 shows a schematic plan view of network 100 (also see FIG. 1). In the shown example, network 100 comprises servers $410_1$-$410_4$ and switches $420_1$-$420_5$ interconnected as indicated in the figure. Servers $410_1$-$410_4$ and switches $420_1$-$420_5$ are examples of network resources $130_k$ (FIG. 1). Network controller 120 (also see FIG. 1) is connected to each of servers $410_1$-$410_4$ and switches $420_1$-$420_5$ via control links 402. The reconfiguration of network 100 illustrated in the example of FIG. 4 includes (i) rerouting at least one data flow in network 100 using the SDN functionality thereof and (ii) re-hosting a VNF in network 100 using the NFV functionality thereof. Based on method 300, this reconfiguration of network 100 may be performed, e.g., as follows.

At steps 304, 306 of method 300, it may be determined that server $410_2$ and switches $420_1$ and $420_2$ have a high probability of failure in the approaching weather event and that corresponding preventive mitigation actions are warranted. At step 308 of method 300, it may be determined that: (i) any flows traversing one or both of switches $420_1$ and $420_2$ are preferably to be rerouted; and (ii) any VNFCs residing in server $410_2$ are preferably to be re-hosted.

For example, one of such flows is a flow between servers $410_1$ and $410_3$, which is currently routed along a network path A indicated in FIG. 4. An evaluation of several rerouting options for this flow performed at step 308 may result in the selection, at step 310, of a network path B for this particular flow. Similarly, an evaluation of several re-hosting options for the VNFs residing in server $410_2$ performed at step 308 may result in the selection, at step 310, of server $410_4$ as the corresponding new VNF host, as indicated by a dashed arrow 412 in FIG. 4.

At step 312 of method 300, the selections for the rerouting and re-hosting may be communicated to network controller 120. In response to the received selections, network controller 120 proceeds to orchestrate and push out the corresponding reconfiguration of network 100 indicated in FIG. 4. Upon reconfiguration, network 100 may beneficially have a lower likelihood of service disruptions and/or outages during and in the immediate aftermath of the upcoming weather event.

Figure 5:
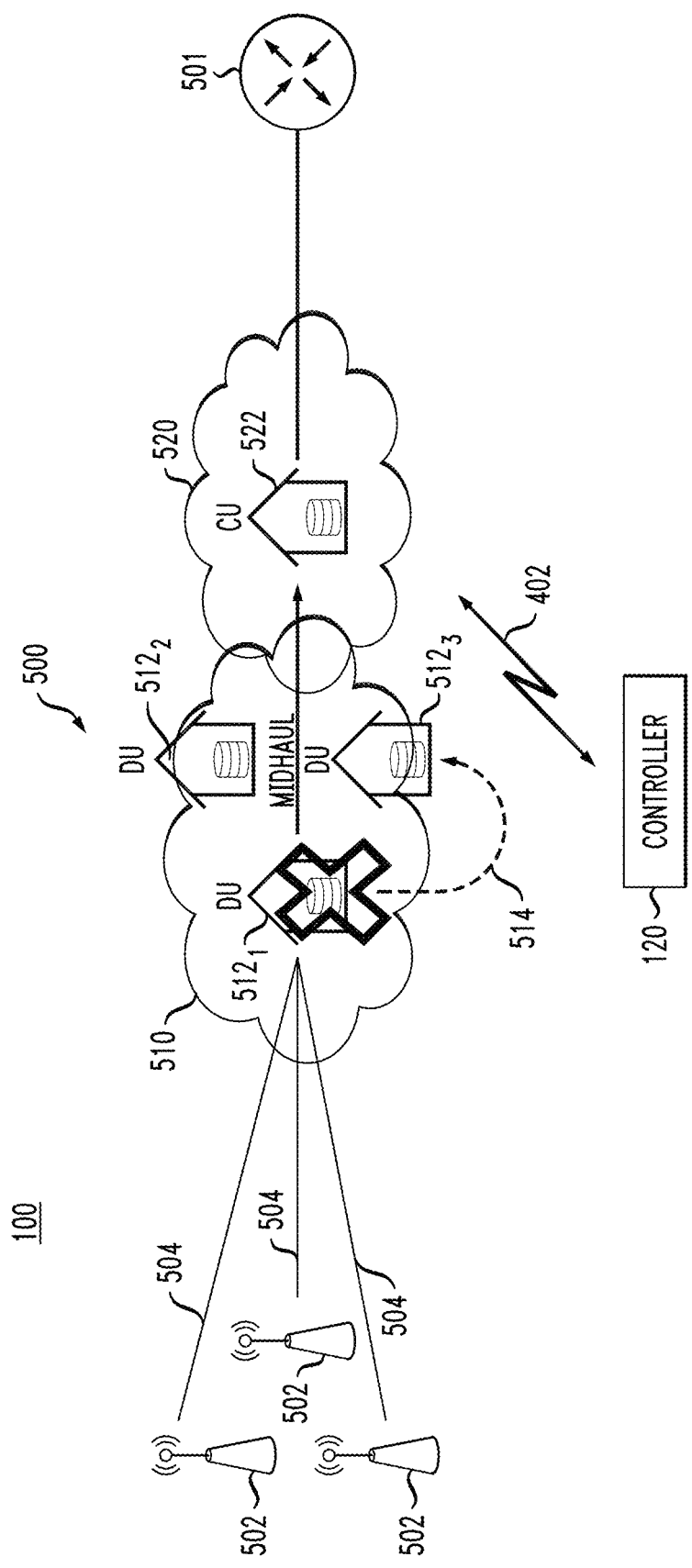
FIG. 5 illustrates an example reconfiguration of the network of FIG. 1 performed based on the method of FIG. 3 according to another embodiment.

FIG. 5 schematically illustrates an example reconfiguration of network 100 performed based on method 300 according to another embodiment. In this particular example, network 100 comprises a radio access network (RAN) 500 and a core network 501. RAN 500 comprises a plurality of remote radio units (RRUs) 502 connected, by way of corresponding fronthaul links 504, to an edge network 510, which is further connected to a central network 520 and core network 501 as indicated in FIG. 5. In some pertinent literature, edge network 510 and central network 520 may be referred to as "edge cloud" and "central cloud," respectively.

Edge network 510 comprises a plurality of distributed units (DUs), only three of which, labeled $512_1$-$512_3$, are explicitly shown in FIG. 5 for illustration purposes. Central network 520 may comprise one or more central units (CUs) 522, only one of which is explicitly shown in FIG. 5 for illustration purposes. In operation, CU 522 handles non-real-time RAN processing functions, such as Radio Resource Control (RRC), Packet Data Convergence Protocol (PDCP), and Service Data Adaptation Protocol (SDAP). In contrast, DUs $512_1$-$512_3$ handle real-time RAN processing functions, such as Radio Link Control (RLC), Medium Access Control (MAC), Physical layer (PHY) control, and Radio Frequency (RF) control, and may be located in relatively close proximity to the respective RRUs 502 to ensure low-latency processing. In this particular example, at least DUs $512_1$ and $512_3$ are virtualized, i.e., implemented using one or more VNFs.

At steps 304, 306 of method 300, it may be determined that the host server of DU $512_1$ has a high probability of failure in the approaching weather event and that corresponding preventive mitigation actions are warranted. At step 308 of method 300, it may be determined that the VNFCs of DU $512_1$ are preferably to be re-hosted. An evaluation of re-hosting options for the VNFCs of DU $512_1$ performed at step 308 may result in the selection, at step 310, of the host server of DU $512_3$ as the corresponding new VNF host, as indicated by a dashed arrow 514 in FIG. 5.

At step 312 of method 300, the selection for the re-hosting may be communicated to network controller 120. In response to the received selection, network controller 120 may use control links 402 to orchestrate and push out the corresponding reconfiguration of edge network 500, wherein: (i) the VNF(s) implementing DU $512_3$ is (are) scaled up to also implement DU $512_1$; and (ii) data flows previously associated with the host server of DU $512_1$ are rerouted to the host server of DU $512_3$. Upon reconfiguration, network 100 may beneficially have a lower likelihood of service disruptions and/or outages during and in the immediate aftermath of the upcoming weather event.

Figure 6:
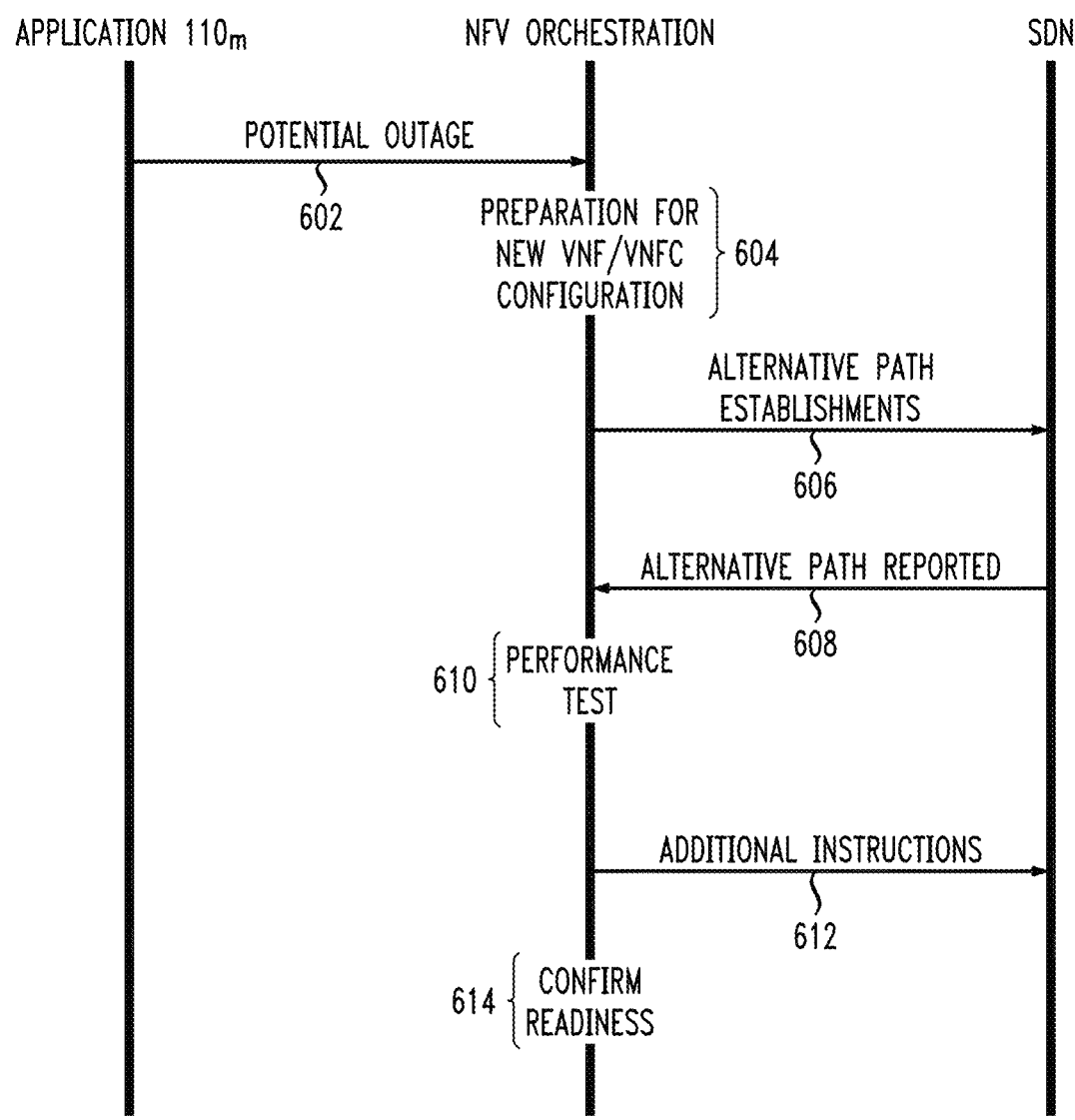
FIG. 6 schematically shows an example flow of control messages in the network of FIG. 1 according to an embodiment.

FIG. 6 schematically shows an example flow of control messages and corresponding processing in network 100 according to an embodiment.

Upon completion of method 300, application $110_m$ may transmit message 602 to network controller 120, notifying the network controller about the potential outage resulting from the upcoming weather event. For example, message 602 may be transmitted at step 312 of method 300 as explained above in reference to FIG. 3.

In response to message 602, the NFV-orchestration module of network controller 120 may perform preparation 604 for the corresponding VNF and/or VNFC reconfiguration. Such preparation may include verification of capacity, reservation of resources, creation of suitable virtual containers, etc. Once preparation 604 is completed, the NFV-orchestration module may transmit message 606 to the SDN control module of network controller 120, requesting establishment of network paths needed for the new configuration. Such establishment may include, e.g., creating new adjacencies, defining new paths, updating routing tables, etc. The establishment results may then be reported back to NFV-orchestration module via message 608.

In response to message 608, the NFV-orchestration module may arrange for a performance test 610 of the new network configuration, including the new VNF/VNFC configuration and newly established network paths. Any problems discovered during the test 610 may trigger transmission of the corresponding additional instructions 612 to the SDN control module intended to fix the observed problems. Steps 610 and 612 may be repeated as needed until the troubleshooting of the new configuration is completed and a final performance test 614 confirms the network's readiness for the new configuration.

Figure 7:
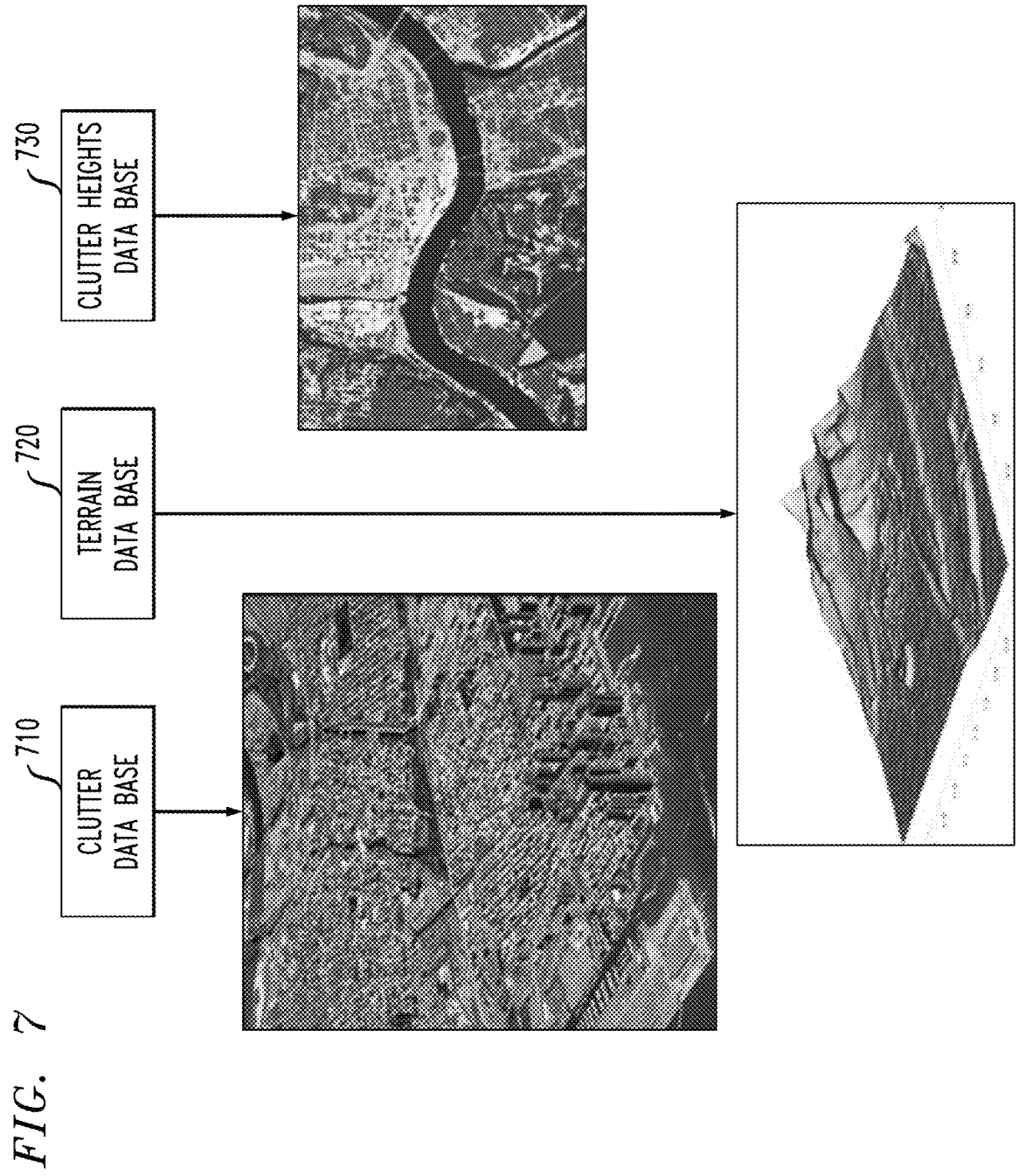
FIG. 7 pictorially shows some example inputs that may be used in the method of FIG. 3 according to an embodiment.

FIG. 7 pictorially shows several example inputs that may be provided to application $110_m$ at step 302 of method 300 according to an embodiment. The shown example inputs include an input from a clutter database 710, an input from a terrain database 720, and an input from a clutter-heights database 730. The images shown in FIG. 7 pictorially illustrate the types of information that may be found in such databases 710-730. Inputs from databases 710-730 may typically be used for computing the probabilities of failure of individual network elements at step 304 of method 300.

For example, inputs from databases 710 and 730 may be used, at step 304, to compute estimated wind velocities at the physical locations of wind-damage-susceptible resources $130_k$ based on wind forecasts 264 (FIG. 2). In particular, information from databases 710 and 730 may be used to adjust wind forecasts 264 for the effects of surface clutter, wind shielding by buildings, wind tunneling, and the like. As such, inputs from databases 710 and 730 may enable application $110_m$ to appropriately refine and customize wind forecasts 264, thereby providing an adjusted wind forecast applicable to specific infrastructure elements of network 100.

Similarly, inputs from database 720 may be used, at step 304, to compute estimated flooding danger at the physical locations of flood-susceptible resources $130_k$ based on precipitation forecast 262 and/or flood forecast 266 (also see FIG. 2). As such, inputs from database 720 may enable application $110_m$ to appropriately refine and customize forecasts 262, 266, thereby providing an adjusted flood-danger forecast applicable to specific infrastructure elements of network 100.

Figure 8:
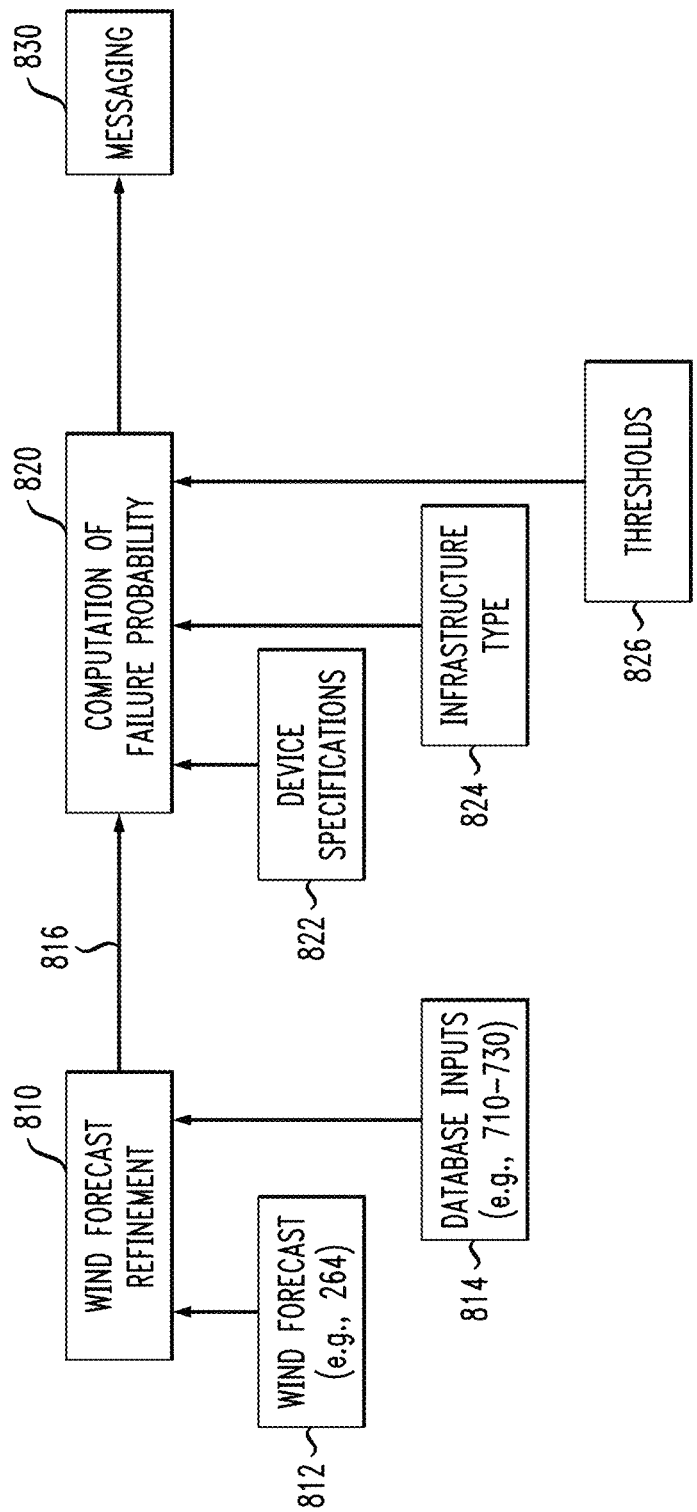
FIG. 8 illustrates example modules and inputs of a risk-assessment application that can be run using the information system of FIG. 2 according to an embodiment.

FIG. 8 illustrates example modules and inputs of application $110_m$ according to an embodiment. More specifically, the example modules and inputs shown in FIG. 8 correspond to wind-related risk assessment performed using application $110_m$. Other types of risk assessment, such as those related to icing, flooding, power outages, etc., may be implemented in a similar manner. The subset of modules of application $110_m$ shown in FIG. 8 includes modules 810, 820, and 830.

Module 810 is a forecast-refinement module. Module 810 may receive inputs 812 and 814. Input 812 may include one or more wind forecasts, e.g., 264, FIG. 2, received from a weather-forecast service, e.g., 260, FIG. 2. Input 814 may include one or more database inputs, e.g., from databases 710-730, FIG. 7. Based on inputs 812, 814, module 810 may generate a refined forecast 816 applicable to individual elements of network 100.

Module 820 is configured to compute failure and/or outage probabilities for individual elements of network 100. In addition to the refined forecast 816, module 820 may receive inputs 822, 824, and 826. Input 822 may provide pertinent specifications, such as weight, dimensions, housing type, etc., of the physical devices used in individual elements of network 100. Input 824 may provide pertinent parameters of the infrastructure parts using which the physical devices are deployed in the field. For example, input 824 may specify: (i) whether the device is pole-, wall-, or ground-mounted; (ii) the type of attachment, e.g., hanging or rigid; (iii) height above the ground, etc. Input 826 may provide any pertinent thresholds for the device tolerances to wind, shock, etc. Based on the inputs 816, 822, 824, and 826, module 820 may perform part of the computations of step 304, FIG. 3.

Module 830 is configured to generate messages to notify the affected entities about the estimated risks associated with the upcoming weather event. Such entities may include but are not limited to device users, network administrators, third-party service providers, pertinent electronic controllers, and the like. Some of such messages may be transmitted at steps 312 and/or 314, FIG. 3.

According to an example embodiment disclosed above, e.g., in the summary section and/or in reference to any one or any combination of some or all of FIGS. 1-8, provided is an apparatus, comprising: an electronic network controller (e.g., 120, FIGS. 1, 4, 5) having an application-programming interface (e.g., 118, FIG. 1) to receive therethrough an indication (e.g., 602, FIG. 6) of potential failure of at least one of network resources during a meteorological event, the network resources including a plurality of servers (e.g., $410_1$-$410_4$, FIG. 4) to host virtual network functions (VNFs) and a plurality of switches configurable using software defined networking (SDN); and wherein, in response to the received indication, the electronic network controller is configured to: orchestrate re-hosting (e.g., 412, FIG. 4; 514, FIG. 5) of at least one VNF component (e.g., one of $132_1$-$132_L$, FIG. 1) to a different one of the servers; and perform SDN-based reconfiguration (e.g., A→B, FIG. 4) of at least one of the switches to adapt network traffic to the at least one VNF component being hosted at the different one of the servers.

In some embodiments of the above apparatus, the apparatus further comprises the plurality of servers and the plurality of switches.

In some embodiments of any of the above apparatus, the at least one VNF component corresponds to a virtualized distributed unit (e.g., $512_1$, FIG. 5) of a radio access network (e.g., 500, FIG. 5).

In some embodiments of the above apparatus, the electronic network controller is configured to perform the re-hosting and the SDN-based reconfiguration to exclude said at least one of the network resources from responding to or processing the network traffic.

In some embodiments of the above apparatus, the electronic network controller is configured to perform the re-hosting and the SDN-based reconfiguration before a failure of said at least one of the network resources during the meteorological event.

In some embodiments of the above apparatus, prior to the re-hosting, at least one of the VNFs has different VNF components thereof hosted at a first set of two or more different ones of the servers; and wherein, in response to receiving the indication of the potential failure, the electronic network controller is configured to orchestrate re-hosting of the at least one of the VNFs to a different second set of the servers.

According to another example embodiment disclosed above, e.g., in the summary section and/or in reference to any one or any combination of some or all of FIGS. 1-8, provided is a method implemented by an electronic network controller (e.g., 120, FIGS. 1, 4, 5), the method comprising the steps of: receiving, through an application-programming interface (e.g., 118, FIG. 1), an indication (e.g., 602, FIG. 6) of potential failure of at least one of network resources during a meteorological event, the network resources including a plurality of servers (e.g., $410_1$-$410_4$, FIG. 4) to host virtual network functions (VNFs) and a plurality of switches configurable using software defined networking (SDN); orchestrating, in response to the indication, re-hosting (e.g., 412, FIG. 4; 514, FIG. 5) of at least one VNF component (e.g., one of $132_1$-$132_L$, FIG. 1) to a different one of the servers; and performing SDN-based reconfiguration (e.g., A→B, FIG. 4) of at least one of the switches to adapt network traffic to the at least one VNF component being hosted at the different one of the servers.

In some embodiments of the above method, the at least one VNF component corresponds to a virtualized distributed unit (e.g., $512_1$, FIG. 5) of a radio access network (e.g., 500, FIG. 5).

In some embodiments of any of the above methods, the method comprises performing the re-hosting and the SDN-based reconfiguration to exclude said at least one of the network resources from responding to or processing the network traffic.

In some embodiments of any of the above methods, the method comprises performing the re-hosting and the SDN-based reconfiguration before a failure of said at least one of the network resources during the meteorological event.

In some embodiments of any of the above methods, prior to the re-hosting, at least one of the VNFs has different VNF components thereof hosted at a first set of two or more different ones of the servers; and the method comprises orchestrating re-hosting of the at least one of the VNFs to a different second set of the servers.

According to yet another example embodiment disclosed above, e.g., in the summary section and/or in reference to any one or any combination of some or all of FIGS. 1-8, provided is a non-transitory machine-readable medium, having encoded thereon program code, wherein, when the program code is executed by a machine (e.g., 210, FIG. 2), the machine implements a method (e.g., 300, FIG. 3) comprising: estimating (e.g., at 304, FIG. 3) individual probabilities of failure for individual ones of network resources during a meteorological event, the network resources including a plurality of servers (e.g., $410_1$-$410_4$, FIG. 4) to host virtual network functions (VNFs) and a plurality of switches configurable using software defined networking (SDN); selecting (e.g., at 306-310, FIG. 3) re-hosting (e.g., 412, FIG. 4; 514, FIG. 5) of at least one VNF component (e.g., one of $132_1$-$132_L$, FIG. 1) to a different one of the servers based on the individual probabilities; and transmitting to an electronic network controller (e.g., 120, FIGS. 1, 4, 5) one or more instructions (e.g., 602, FIG. 6) to orchestrate the re-hosting and to perform SDN-based reconfiguration (e.g., A→B, FIG. 4) of at least one of the switches to adapt network traffic to the at least one VNF component being hosted at the different one of the servers.

In some embodiments of the above non-transitory machine-readable medium, the method comprises estimating the individual probabilities based on one or more of: information (e.g., 228, FIG. 2) received from a weather-forecast service for a geographical area corresponding to the network resources; geographical locations of the individual ones of the network resources; tolerances of the individual ones of the network resources to specific environmental conditions; network damage caused by previous meteorological events in the geographical area; and alerts from power suppliers.

In some embodiments of any of the above non-transitory machine-readable mediums, the method further comprises estimating (e.g., at 304, FIG. 3) individual outage probabilities during the meteorological event for individual services implemented using the network resources.

In some embodiments of any of the above non-transitory machine-readable mediums, the method comprises selecting the re-hosting (e.g., at 308, 310, FIG. 3) to reduce at least one of the outage probabilities.

In some embodiments of any of the above non-transitory machine-readable mediums, the estimating comprises generating individual forecasts for the individual ones of the network resources by refining (e.g., 810, FIG. 8) a weather-service forecast corresponding to the meteorological event.

According to yet another example embodiment disclosed above, e.g., in the summary section and/or in reference to any one or any combination of some or all of FIGS. 1-8, provided is a machine-implemented method, comprising the steps of: estimating (e.g., at 304, FIG. 3) individual probabilities of failure for individual ones of network resources during a meteorological event, the network resources including a plurality of servers (e.g., $410_1$-$410_4$, FIG. 4) to host virtual network functions (VNFs) and a plurality of switches configurable using software defined networking (SDN); selecting (e.g., at 306-310, FIG. 3) re-hosting (e.g., 412, FIG. 4; 514, FIG. 5) of at least one VNF component (e.g., one of $132_1$-$132_L$, FIG. 1) to a different one of the servers based on the individual probabilities; and transmitting to an electronic network controller (e.g., 120, FIGS. 1, 4, 5) a set of instructions (e.g., 602, FIG. 6) to orchestrate the re-hosting and to perform SDN-based reconfiguration (e.g., A→B, FIG. 4) of at least one of the switches to adapt network traffic to the at least one VNF component being hosted at the different one of the servers.

In some embodiments of the above method, the method further comprises estimating the individual probabilities based on one or more of: information (e.g., 228, FIG. 2) received from a weather-forecast service for a geographical area corresponding to the network resources; geographical locations of the individual ones of the network resources; tolerances of the individual ones of the network resources to specific environmental conditions; network damage caused by previous meteorological events in the geographical area; and alerts from power suppliers.

In some embodiments of any of the above methods, the method further comprises estimating (e.g., at 304, FIG. 3) individual outage probabilities during the meteorological event for individual services implemented using the network resources.

In some embodiments of any of the above methods, the method comprises selecting the re-hosting (e.g., at 308, 310, FIG. 3) to reduce at least one of the outage probabilities.

In some embodiments of any of the above methods, the estimating comprises generating individual forecasts for the individual ones of the network resources by refining (e.g., 810, FIG. 8) a weather-service forecast corresponding to the meteorological event.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments can be embodied in the form of methods and apparatuses for practicing those methods. Some embodiments can also be embodied in the form of program code recorded in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the patented invention(s). Some embodiments can also be embodied in the form of program code, for example, stored in a non-transitory machine-readable storage medium including being loaded into and/or executed by a machine, wherein, when the program code is loaded into and executed by a machine, such as a computer or a processor, the machine becomes an apparatus for practicing the patented invention(s). When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

"SUMMARY OF SOME SPECIFIC EMBODIMENTS" in this specification is intended to introduce some example embodiments, with additional embodiments being described in "DETAILED DESCRIPTION" and/or in reference to one or more drawings. "SUMMARY OF SOME SPECIFIC EMBODIMENTS" is not intended to identify essential elements or features of the claimed subject matter, nor is it intended to limit the scope of the claimed subject matter.

What is claimed is:

1. An apparatus, comprising:
   an electronic network controller having an application-programming interface to receive therethrough an indication of potential failure of at least one of network resources during a meteorological event, the network resources including a plurality of servers to host virtual network functions (VNFs) and a plurality of switches configurable using software defined networking (SDN);
   wherein, in response to the received indication, the electronic network controller is configured to:
     orchestrate re-hosting of at least one VNF component to a different one of the servers; and
     perform SDN-based reconfiguration of at least one of the switches to adapt network traffic to the at least one VNF component being hosted at the different one of the servers;
   wherein, prior to the re-hosting, at least one of the VNFs has different VNF components thereof hosted at a first set of two or more different ones of the servers; and
   wherein, in response to receiving the indication of the potential failure, the electronic network controller is configured to orchestrate re-hosting of the at least one of the VNFs to a different second set of the servers.

2. The apparatus of claim 1, further comprising the plurality of servers and the plurality of switches.

3. The apparatus of claim 1, wherein the at least one VNF component corresponds to a virtualized distributed unit of a radio access network.

4. The apparatus of claim 1, wherein the electronic network controller is configured to perform the re-hosting and the SDN-based reconfiguration to exclude said at least one of the network resources from responding to or processing the network traffic.

5. The apparatus of claim 1, wherein the electronic network controller is configured to perform the re-hosting and the SDN-based reconfiguration before a failure of said at least one of the network resources during the meteorological event.

6. A method implemented by an electronic network controller, the method comprising:
   receiving, through an application-programming interface, an indication of potential failure of at least one of network resources during a meteorological event, the network resources including a plurality of servers to host virtual network functions (VNFs) and a plurality of switches configurable using software defined networking (SDN);
   orchestrating, in response to the indication, re-hosting of at least one VNF component to a different one of the servers; and
   performing SDN-based reconfiguration of at least one of the switches to adapt network traffic to the at least one VNF component being hosted at the different one of the servers, wherein:
     prior to the re-hosting, at least one of the VNFs has different VNF components thereof hosted at a first set of two or more different ones of the servers; and
     the method comprises orchestrating re-hosting of the at least one of the VNFs to a different second set of the servers.

7. The method of claim 6, wherein the at least one VNF component corresponds to a virtualized distributed unit of a radio access network.

8. The method of claim 6, comprising performing the re-hosting and the SDN-based reconfiguration to exclude said at least one of the network resources from responding to or processing the network traffic.

9. The method of claim 6, comprising performing the re-hosting and the SDN-based reconfiguration before a failure of said at least one of the network resources during the meteorological event.

10. A non-transitory machine-readable medium, having encoded thereon program code, wherein, when the program code is executed by a machine, the machine implements a method comprising:
    estimating individual probabilities of failure for individual ones of network resources during a meteorological event, the network resources including a plurality of servers to host virtual network functions (VNFs) and a plurality of switches configurable using software defined networking (SDN);
    selecting re-hosting of at least one VNF component to a different one of the servers based on the individual probabilities; and
    transmitting to an electronic network controller one or more instructions to orchestrate the re-hosting and to perform SDN-based reconfiguration of at least one of the switches to adapt network traffic to the at least one VNF component being hosted at the different one of the servers;
    wherein, prior to the re-hosting, at least one of the VNFs has different VNF components thereof hosted at a first set of two or more different ones of the servers; and
    wherein, in response to receiving the indication of the potential failure, the electronic network controller is configured to orchestrate re-hosting of the at least one of the VNFs to a different second set of the servers.

11. The non-transitory machine-readable medium of claim 10, wherein the method comprises estimating the individual probabilities based on one or more of:
information received from a weather-forecast service for a geographical area corresponding to the network resources;
geographical locations of the individual ones of the network resources;
tolerances of the individual ones of the network resources to specific environmental conditions;
network damage caused by previous meteorological events in the geographical area; and
alerts from power suppliers.

12. The non-transitory machine-readable medium of claim 10, wherein the method further comprises estimating individual outage probabilities during the meteorological event for individual services implemented using the network resources.

13. The non-transitory machine-readable medium of claim 12, wherein the method comprises selecting the re-hosting to reduce at least one of the outage probabilities.

14. The non-transitory machine-readable medium of claim 10, wherein the estimating comprises generating individual forecasts for the individual ones of the network resources by refining a weather-service forecast corresponding to the meteorological event.

15. A machine-implemented method, comprising:
estimating individual probabilities of failure for individual ones of network resources during a meteorological event, the network resources including a plurality of servers to host virtual network functions (VNFs) and a plurality of switches configurable using software defined networking (SDN);
selecting re-hosting of at least one VNF component to a different one of the servers based on the individual probabilities; and
transmitting to an electronic network controller a set of instructions to orchestrate the re-hosting and to perform SDN-based reconfiguration of at least one of the switches to adapt network traffic to the at least one VNF component being hosted at the different one of the servers;
wherein, prior to the re-hosting, at least one of the VNFs has different VNF components thereof hosted at a first set of two or more different ones of the servers; and
wherein, in response to receiving the indication of the potential failure, the electronic network controller is configured to orchestrate re-hosting of the at least one of the VNFs to a different second set of the servers.

16. The method of claim 15, further comprising estimating the individual probabilities based on one or more of:
information received from a weather-forecast service for a geographical area corresponding to the network resources;
geographical locations of the individual ones of the network resources;
tolerances of the individual ones of the network resources to specific environmental conditions;
network damage caused by previous meteorological events in the geographical area; and
alerts from power suppliers.

17. The method of claim 15, further comprising estimating individual outage probabilities during the meteorological event for individual services implemented using the network resources.

18. The method of claim 17, comprising selecting the re-hosting to reduce at least one of the outage probabilities.

19. The method of claim 15, wherein the estimating comprises generating individual forecasts for the individual ones of the network resources by refining a weather-service forecast corresponding to the meteorological event.

* * * * *